United States Patent
Park et al.

(10) Patent No.: US 8,164,715 B2
(45) Date of Patent: Apr. 24, 2012

(54) POLARIZER AND LIQUID CRYSTAL DISPLAY USING THE SAME

(75) Inventors: Jae-Hong Park, Cheongju-si (KR); Jong-Sung Park, Cheongju-si (KR); Min-Su Kim, Cheongju-si (KR); Sung-Hyun Kim, Cheongju-si (KR)

(73) Assignee: LG Chem, Ltd., Seoul (KR)

( * ) Notice: Subject to any disclaimer, the term of this patent is extended or adjusted under 35 U.S.C. 154(b) by 464 days.

(21) Appl. No.: 12/309,761

(22) PCT Filed: Jul. 27, 2007

(86) PCT No.: PCT/KR2007/003633
§ 371 (c)(1),
(2), (4) Date: Jan. 29, 2009

(87) PCT Pub. No.: WO2008/016242
PCT Pub. Date: Feb. 7, 2008

(65) Prior Publication Data
US 2009/0251644 A1 Oct. 8, 2009

(30) Foreign Application Priority Data
Jul. 31, 2006 (KR) .......... 10-2006-0072305

(51) Int. Cl.
G02F 1/1333 (2006.01)
G02B 5/30 (2006.01)
G02B 27/28 (2006.01)
(52) U.S. Cl. .......... 349/96; 359/485.01; 359/485.03
(58) Field of Classification Search .......... None
See application file for complete search history.

(56) References Cited

U.S. PATENT DOCUMENTS
6,831,713 B2 * 12/2004 Sugino et al. .......... 349/96
(Continued)

FOREIGN PATENT DOCUMENTS
JP 2004-245925 9/2004
(Continued)

OTHER PUBLICATIONS
Machine translation of Japanese Application No. 2004-161331, corresponding to Futamura et al. JP 2005-338736A, Dec. 8, 2005.*

Primary Examiner — Michelle R Connelly
(74) Attorney, Agent, or Firm — McKenna Long & Aldridge LLP

(57) ABSTRACT

Disclosed is a liquid crystal display and a polarizing plate used in the same. The liquid crystal display includes a liquid crystal cell and a first polarizing plate and a second polarizing plate respectively provided on each side of the liquid crystal cell. The first polarizing plate and the second polarizing plate each includes a polyvinyl alcohol polarizing film and protective films provided on both sides of the polyvinyl alcohol polarizing film, the protective films that are provided on surfaces opposite to the liquid crystal cell of the first polarizing plate and the second polarizing plate each has vapor transmissivity of 100 g/m Day or less, and the protective films that are provided on surfaces abutting the liquid crystal cell of the first polarizing plate and the second polarizing plate each has the vapor transmissivity of more than 1,500 g/m Day. When the protective films that are provided on surfaces opposite to the liquid crystal cell of the first polarizing plate and the second polarizing plate each has a UV absorption ability, the protective films that are provided on surfaces abutting the liquid crystal cell of the first polarizing plate and the second polarizing plate each has the vapor transmissivity of more than 200 g/m Day.

22 Claims, 6 Drawing Sheets

| FILM 1 HAVING VAPOR TRANSMISSIVITY OF 100 G/M²DAY OR LESS |
|---|
| PVA |
| FILM HAVING VAPOR TRANSMISSIVITY OF MORE THAN 1,500 G/M²DAY |
| PSA |
| LIQUID CRYSTAL CELL |
| PSA |
| FILM HAVING VAPOR TRANSMISSIVITY OF MORE THAN 1,500 G/M²DAY |
| PVA |
| FILM 2 HAVING VAPOR TRANSMISSIVITY OF 100 G/M²DAY OR LESS |

| UV ABSORPTION LAYER |
|---|
| FILM HAVING VAPOR TRANSMISSIVITY OF 100 G/M²DAY OR LESS |
| LUMINANCE IMPROVEMENT FILM |
| FILM HAVING VAPOR TRANSMISSIVITY OF MORE THAN 200 G/M²DAY |
| PVA(POLARIZING FILM) |
| FILM HAVING VAPOR TRANSMISSIVITY OF MORE THAN 200 G/M²DAY |
| PSA(ADHESIVE) |

U.S. PATENT DOCUMENTS

| | | | |
|---|---|---|---|
| 7,399,376 B2 * | 7/2008 | Wang et al. | 156/307.3 |
| 7,504,139 B2 * | 3/2009 | Kawanishi et al. | 428/1.54 |
| 7,622,185 B2 * | 11/2009 | Wang et al. | 428/327 |
| 7,662,456 B2 * | 2/2010 | Bell | 428/40.1 |
| 2005/0249962 A1 | 11/2005 | Chen et al. | |
| 2006/0062934 A1 | 3/2006 | Hayashi et al. | |
| 2008/0254236 A1 * | 10/2008 | Kawanishi et al. | 428/1.1 |
| 2009/0251643 A1 * | 10/2009 | Yamada et al. | 349/96 |

FOREIGN PATENT DOCUMENTS

| | | | |
|---|---|---|---|
| JP | 2005-004995 | | 1/2005 |
| JP | 2005-17435 | | 1/2005 |
| JP | 2005-128520 | | 5/2005 |
| JP | 2005-156734 A | | 6/2005 |
| JP | 2005338736 A | * | 12/2005 |
| JP | 2006-11409 | | 1/2006 |
| JP | 2006-23573 A | | 1/2006 |
| JP | 2006-030950 | | 2/2006 |

* cited by examiner

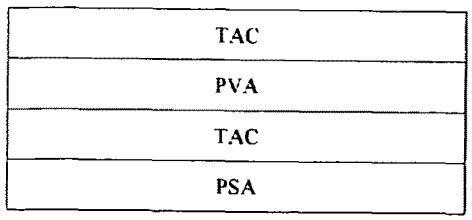
[Fig. 1]
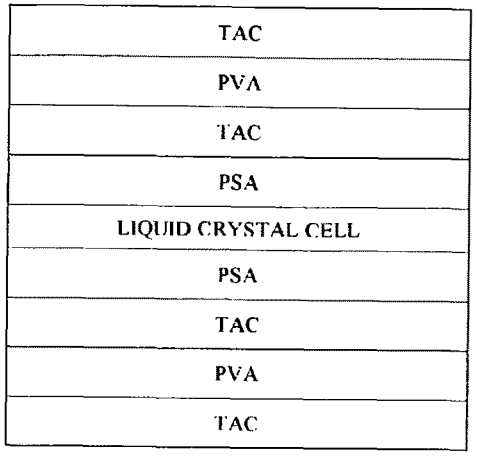
[Fig. 2]
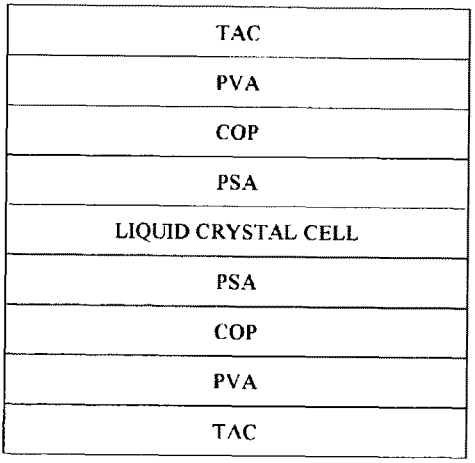
[Fig. 3]
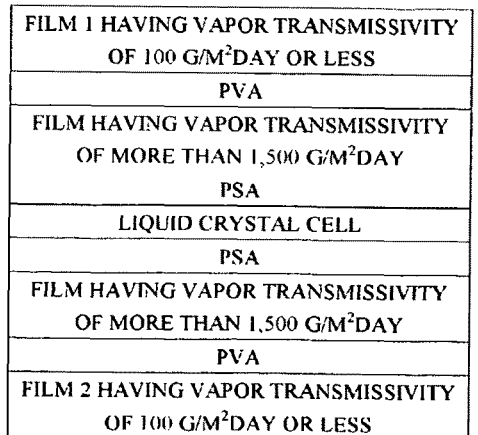
[Fig. 4]

[Fig. 5]

| REFLECTION PREVENTION LAYER OR LOW REFLECTION COATING LAYER |
|---|
| UV ABSORPTION LAYER |
| FILM HAVING VAPOR TRANSMISSIVITY OF 100 G/M²DAY OR LESS |
| PVA(POLARIZING FILM) |
| FILM HAVING VAPOR TRANSMISSIVITY OF MORE THAN 200 G/M²DAY |
| PSA(ADHESIVE) |

[Fig. 6]

| REFLECTION PREVENTION LAYER OR HARD COATING LAYER |
|---|
| UV ABSORPTION LAYER |
| FILM HAVING VAPOR TRANSMISSIVITY OF 100 G/M²DAY OR LESS |
| PVA(POLARIZING FILM) |
| FILM HAVING VAPOR TRANSMISSIVITY OF MORE THAN 200 G/M²DAY |
| PSA(ADHESIVE) |

[Fig. 7]

| LUMINANCE IMPROVEMENT FILM |
|---|
| UV ABSORPTION LAYER |
| FILM HAVING VAPOR TRANSMISSIVITY OF 100 G/M²DAY OR LESS |
| PVA(POLARIZING FILM) |
| FILM HAVING VAPOR TRANSMISSIVITY OF MORE THAN 200 G/M²DAY |
| PSA(ADHESIVE) |

[Fig. 8]

| UV ABSORPTION LAYER |
|---|
| FILM HAVING VAPOR TRANSMISSIVITY OF 100 G/M²DAY OR LESS |
| LUMINANCE IMPROVEMENT FILM |
| FILM HAVING VAPOR TRANSMISSIVITY OF MORE THAN 200 G/M²DAY |
| PVA(POLARIZING FILM) |
| FILM HAVING VAPOR TRANSMISSIVITY OF MORE THAN 200 G/M²DAY |
| PSA(ADHESIVE) |

[Fig. 9]

| ANTISTATIC COATING LAYER |
|---|
| UV ABSORPTION LAYER |
| FILM 1 HAVING VAPOR TRANSMISSIVITY OF 100 G/M²DAY OR LESS |
| PVA(POLARIZING FILM) |
| FILM HAVING VAPOR TRANSMISSIVITY OF MORE THAN 200 G/M²DAY |
| PSA(ADHESIVE) |

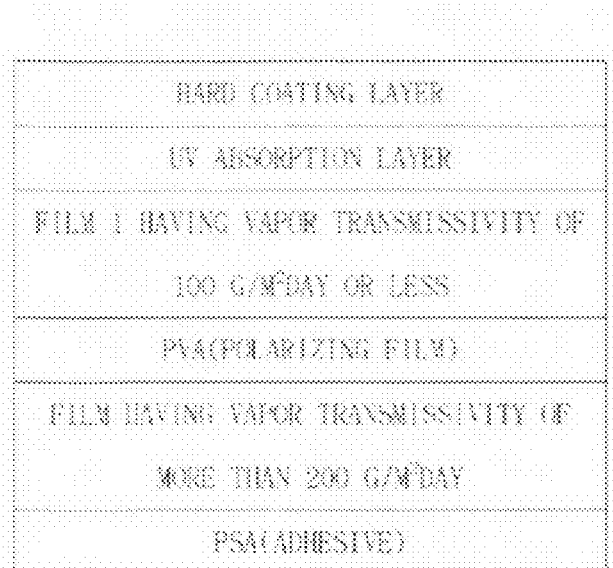
[Fig. 10]
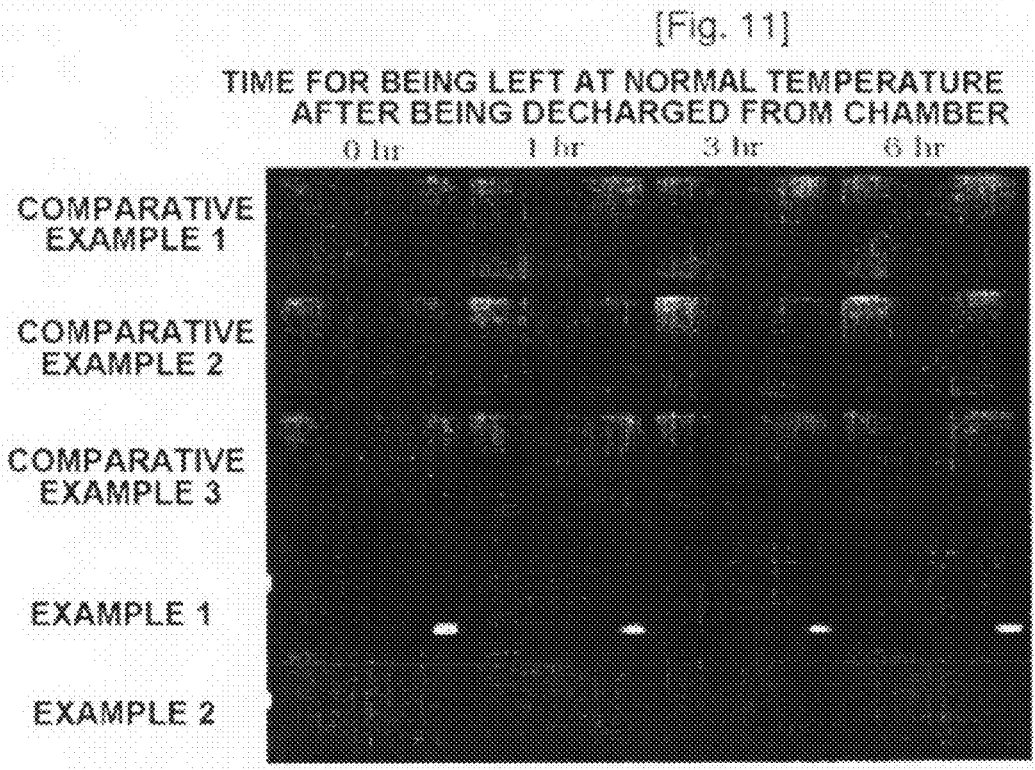
[Fig. 11]

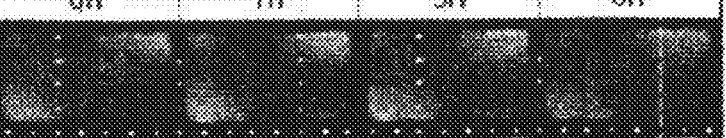
[Fig. 12]
[Fig. 13]

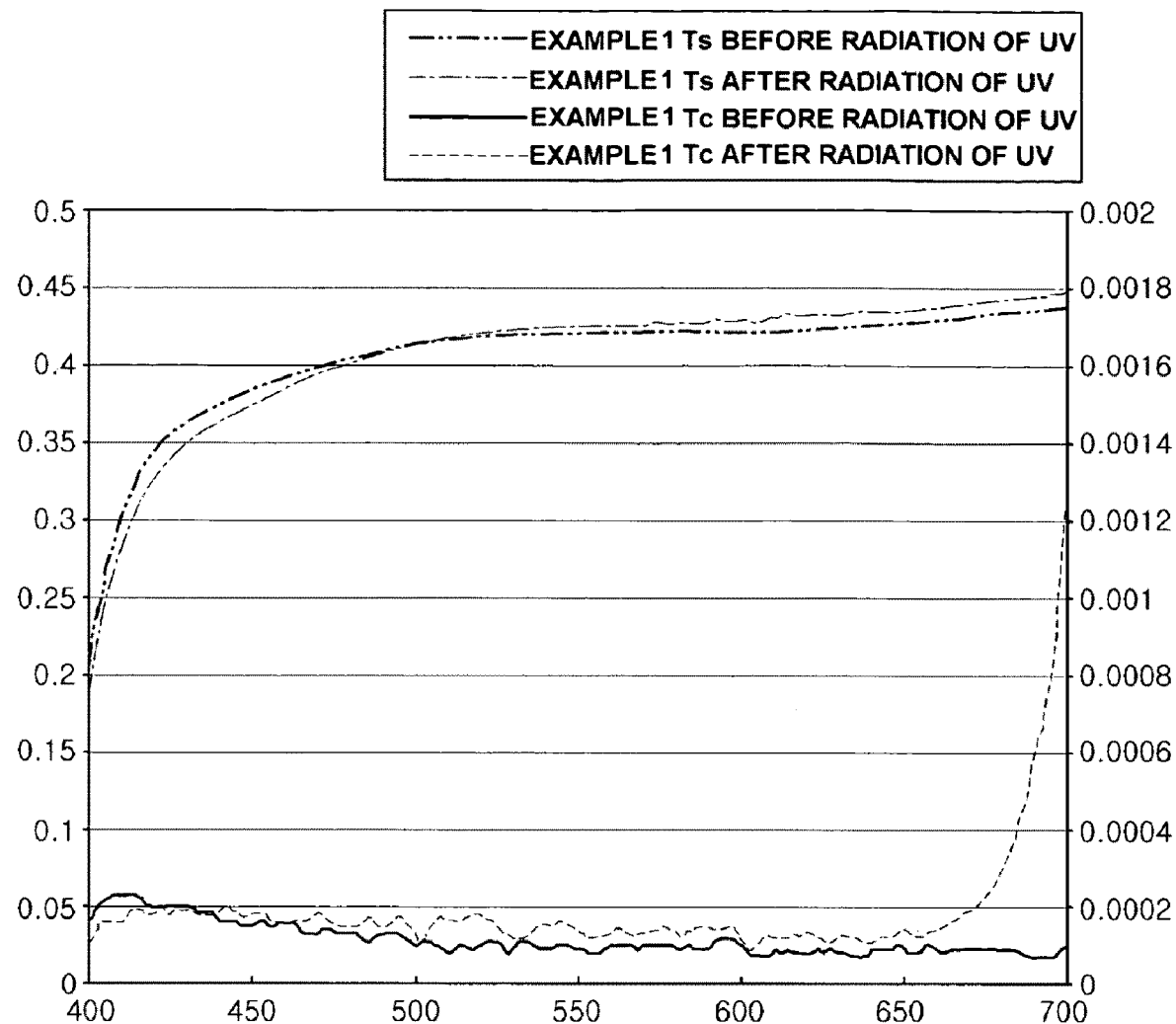

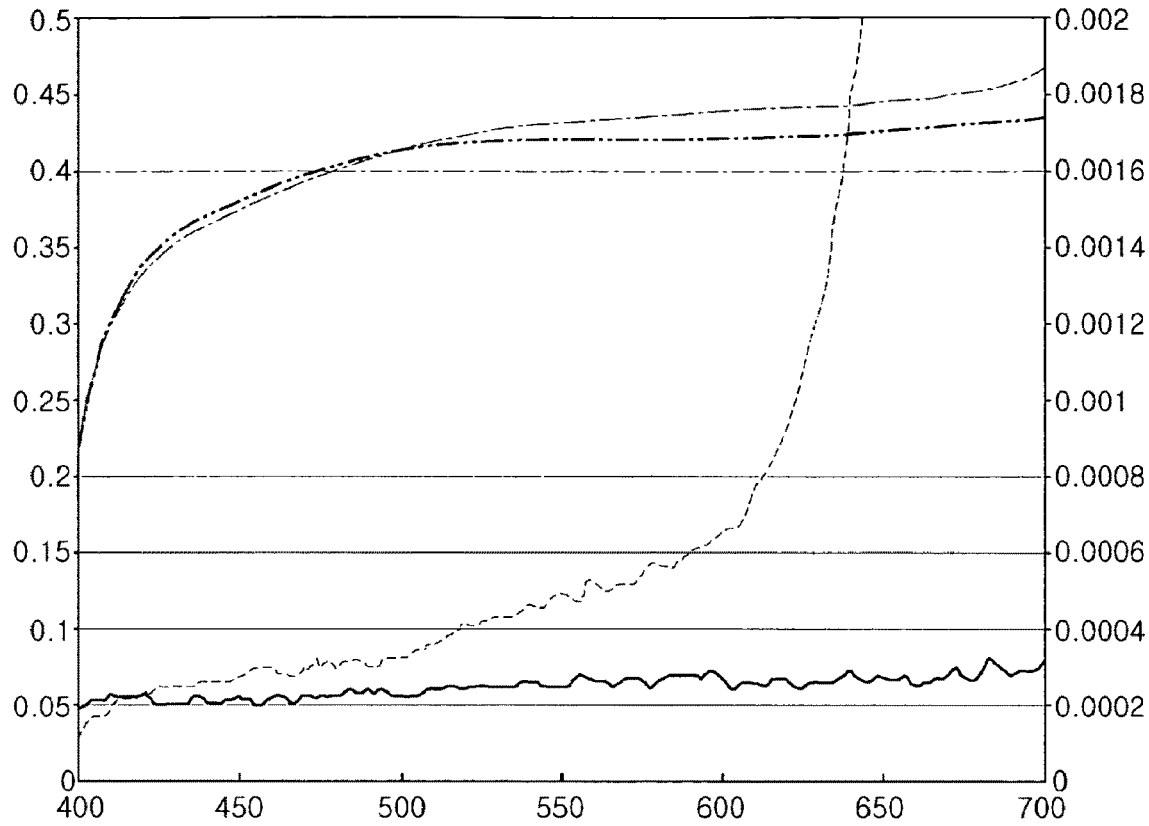

POLARIZER AND LIQUID CRYSTAL DISPLAY USING THE SAME

This application claims the benefit of PCT/KR2007/003633 filed on Jul. 27, 2007 and also Korean Patent Application No. 10-2006-0072305 filed on Jul. 31, 2006, which are hereby incorporated by reference for all purposes as if fully set forth herein.

TECHNICAL FIELD

The present invention relates to a polarizing plate and a liquid crystal display using the same. More particularly, the present invention pertains to a liquid crystal display that has an arrangement structure of protective films of polarizing plates useful to avoid light leakage, yellowing, and egg-mura and prevent moisture absorption, and a polarizing plate that is used in the liquid crystal display. This application claims priority from Korean Patent Application No. 10-2006-0072305 filed on Jul. 31, 2006 in the KIPO, the disclosure of which is incorporated herein by reference in its entirety.

BACKGROUND ART

In a known polarizing plate, a triacetyl cellulose (TAC) film that acts as a protective film is adhered to a polarizing film in which iodine or dichromatic dyes are adsorbed and aligned on a polyvinyl alcohol (hereinafter, referred to as "PVA") polymer film by using adhesives. A known polarizing plate that includes triacetyl cellulose (TAC) films provided on both sides of a polarizing film is shown in FIG. 1. A pressure sensitive adhesive (PSA) layer is further provided on a side of the polarizing plate of FIG. 1 to apply the polarizing plate to the liquid crystal display. The liquid crystal display that includes the polarizing plate of FIG. 1 is shown in FIG. 2.

However, since the triacetyl cellulose (TAC) film has the high moisture absorptivity or moisture transmissivity, the polarizing plate that includes the triacetyl cellulose (TAC) film as the protective film is problematic in that a polarizing ability is reduced in a hot and humid atmosphere. Hence, a polarizing plate that includes a film having the low absorptivity or vapor transmissivity as a protective film has been suggested. Examples thereof include a polarizing plate that is shown in FIG. 3 and includes a cycloolefin resin film as an inner protective film provided on a liquid crystal cell of both sides of the polarizing plate.

However, in the related art, in the case where the triacetyl cellulose (TAC) film is disposed at an outermost edge of the liquid crystal display, since the triacetyl cellulose (TAC) film has a poor moisture prevention ability, the polyvinyl alcohol resin film that is vulnerable to moisture absorbs moisture. In this case, there are problems in that a polarizing ability is reduced due to a change in size of the polyvinyl alcohol resin film and light leakage occurs.

DISCLOSURE OF INVENTION

Technical Problem

Accordingly, there remains a need to develop a technology for preventing reduction in functions, particularly, durability of a polarizing plate, and problems such as light leakage, yellowing, and egg-mura in a hot and humid atmosphere.

Technical Solution

The present inventors have found the following facts. In a liquid crystal display that is provided with a liquid crystal cell and polarizing plates disposed on both sides of the liquid crystal cell, a protective film of the polarizing plate disposed at an outermost edge of the liquid crystal display, that is, an outer protective film of the polarizing plate, significantly affects the moisture absorptivity and the moisture transmissivity of the polarizing plate to prevent functions of the polarizing plate from being reduced in a humid atmosphere. However, a protective film abutting the liquid crystal cell of the polarizing plate, that is, an inner protective film of the polarizing plate, insignificantly affects the moisture absorptivity and the moisture transmissivity of the polarizing plate. Thus, it is possible to select various types of inner protective films in consideration of improvement in adhesion strength to the liquid crystal cell and prevention of light leakage and egg-mura.

Therefore, it is an object of the present invention to provide a liquid crystal display that includes polarizing plates arranged so that durability is excellent in a humid atmosphere and prevents light leakage and egg-mura, and a polarizing plate used in the same.

In order to achieve the above object, the present invention provides a liquid crystal display that includes a liquid crystal cell and a first polarizing plate and a second polarizing plate respectively provided on each side of the liquid crystal cell, wherein the first polarizing plate and the second polarizing plate each includes a polyvinyl alcohol polarizing film and protective films provided on both sides of the polyvinyl alcohol polarizing film, the protective films that are provided on surfaces opposite to the liquid crystal cell of the first polarizing plate and the second polarizing plate each has the vapor transmissivity of 100 g/m$^2$ Day or less, and the protective films that are provided on surfaces abutting the liquid crystal cell of the first polarizing plate and the second polarizing plate each has the vapor transmissivity of more than 1,500 g/m$^2$ Day.

Furthermore, the present invention provides a liquid crystal display that includes a liquid crystal cell and a first polarizing plate and a second polarizing plate respectively provided on each side of the liquid crystal cell, wherein the first polarizing plate and the second polarizing plate each includes a polyvinyl alcohol polarizing film and protective films provided on both sides of the polyvinyl alcohol polarizing film, the protective films that are provided on surfaces opposite to the liquid crystal cell of the first polarizing plate and the second polarizing plate each has the vapor transmissivity of 100 g/m$^2$ Day or less, the protective films that are provided on surfaces abutting the liquid crystal cell of the first polarizing plate and the second polarizing plate each has the vapor transmissivity of more than 200 g/m$^2$ Day, and the film having the vapor transmissivity of 100 g/m$^2$ Day or less contains a UV absorbing agent or a UV absorption layer is provided on an upper surface or a lower surface of the film having the vapor transmissivity of 100 g/m$^2$ Day or less.

Furthermore, the present invention provides a polarizing plate that is capable of being used in the liquid crystal display.

Specifically, an embodiment of the present invention provides a polarizing plate that includes a polyvinyl alcohol polarizing film, a film that is provided on an upper surface of the polyvinyl alcohol polarizing film and has the vapor transmissivity of 100 g/m$^2$ Day or less, a film that is provided on a lower surface of the polyvinyl alcohol polarizing film and has the vapor transmissivity of more than 200 g/m$^2$ Day, and a UV absorption layer that is provided on the upper or lower surface of the film having the vapor transmissivity of 100 g/m$^2$ Day or less.

In the polarizing plate, a film that is provided on an upper surface of the polyvinyl alcohol polarizing film and has the vapor transmissivity of more than 200 g/m² Day and a luminance improvement film that is provided on an upper surface of the film having the vapor transmissivity of more than 200 g/m² Day may be further provided between the polyvinyl alcohol polarizing film and the film having the vapor transmissivity of 100 g/m² Day or less.

Advantageous Effects

A liquid crystal display according to the present invention is advantageous in that functions of a polarizing plate are insignificantly reduced and light leakage and egg-mura are prevented in a humid atmosphere. Furthermore, yellowing does not occur.

BRIEF DESCRIPTION OF THE DRAWINGS

FIG. 1 illustrates a structure of a conventional polarizing plate;
FIG. 2 illustrates a structure of a liquid crystal display that includes a conventional polarizing plate;
FIG. 3 illustrates a structure of a liquid crystal display that includes a conventional polarizing plate;
FIG. 4 illustrates a structure of a liquid crystal display according to an embodiment of the present invention;
FIGS. 5 to 10 illustrate structures of polarizing plates according to embodiments of the present invention;
FIGS. 11 to 13 illustrate light leakage prevention of the liquid crystal display according to the type of outer and inner protective films of the polarizing plate;
FIGS. 14 and 15 are graphs showing optical properties of the polarizing plates that are produced in Examples 1 and 2 before and after UV is radiated; and
FIG. 16 schematically illustrates a procedure of measuring the transmissivity of the polarizing plate.

BEST MODE FOR CARRYING OUT THE INVENTION

Hereinafter, the present invention will be described in detail.

A liquid crystal display according to the present invention includes a liquid crystal cell and a first polarizing plate and a second polarizing plate respectively provided on each side of the liquid crystal cell. In the liquid crystal display, the first polarizing plate and the second polarizing plate each includes a polyvinyl alcohol polarizing film and protective films provided on both sides of the polyvinyl alcohol polarizing film, the protective films that are provided on surfaces opposite to the liquid crystal cell of the first polarizing plate and the second polarizing plate each has the vapor transmissivity of 100 g/m² Day or less, and the protective films that are provided on surfaces abutting the liquid crystal cell of the first polarizing plate and the second polarizing plate each has the vapor transmissivity of more than 1,500 g/m² Day. The structure of the liquid crystal display according to the present invention is shown in FIG. 4, but the scope of the present invention is not limited thereto.

Additionally, in the liquid crystal display according to the present invention, the protective films that are provided on surfaces opposite to the liquid crystal cell of the first polarizing plate and the second polarizing plate each has the vapor transmissivity of 100 g/m² Day or less, the protective films that are provided on surfaces abutting the liquid crystal cell of the first polarizing plate and the second polarizing plate each has the vapor transmissivity of more than 200 g/m² Day, and the film having the vapor transmissivity of 100 g/m² Day or less contains a UV absorbing agent or a UV absorption layer is provided on an upper surface or a lower surface of the film having the vapor transmissivity of 100 g/m² Day or less.

In the present invention, the film that has the vapor transmissivity of 100 g/m² Day or less is used as the protective film of the polarizing plate that is disposed at an outermost edge of the liquid crystal display. Thus, reduction in functions of the polarizing plate in a humid atmosphere is very efficiently prevented as compared to a liquid crystal display in which the film having the vapor transmissivity of 100 g/m² Day or less is used, but is disposed at another position, for example, at an inner protective film of the polarizing plate shown in FIG. 3.

In addition, since the film having the vapor transmissivity of more than 1500 g/m² Day is used as the protective film of the polarizing film that is provided on the surface abutting the liquid crystal cell, light leakage, yellowing, and egg-mura are desirably prevented. The term "egg-mura" means formation of an egg-shaped stain. In the case where the UV absorbing agent is added to the protective film of the polarizing film that is provided on the surface opposite to the liquid crystal cell or the UV absorption layer is provided on the protective film to ensure a UV absorption ability, even though the film having the vapor transmissivity of more than 200 g/m² Day is used as the polarizer protective film that is provided on the surface abutting the liquid crystal cell, light leakage, yellowing, and egg-mura are desirably prevented.

In the present invention, a film where molecules of a polymer film formed by using polyvinyl alcohol are arranged in a predetermined direction and iodine or a dichromatic material is adsorbed may be used as the polyvinyl alcohol polarizing film that is an element constituting the first polarizing plate and the second polarizing plate. Examples of the film include a polyvinyl alcohol☐iodine polarizing film that is formed by uniaxially stretching the film in a boric acid bath after iodine is adsorbed on the polyvinyl alcohol film, a polyvinyl alcohol☐dye polarizing film that is formed by uniaxially stretching the film after a dichromatic dye is diffused and adsorbed on a polyvinyl alcohol film, a polyvinyl alcohol☐polyvinylene polarizing film that has a polyvinylene structure and is formed by adsorbing iodine on a polyvinyl alcohol film and stretching the film, a polyvinyl alcohol☐metal polarizing film that is formed by adsorbing metal such as silver, mercury, and iron on a polyvinyl alcohol film, a near-ultraviolet polarizing film that is formed by treating a polyvinyl alcohol film using a boric acid solution containing potassium iodide and sodium thiosulfate, and a polarizing film in which a dichromatic dye is added to a surface and/or an inside of a polyvinyl alcohol film that includes denatured polyvinyl alcohol having a cation group in a molecule thereof. However, the examples of the film are not limited thereto, and any film known in the related art may be used.

The method of producing the polyvinyl alcohol polarizing film is not limited. Examples of the method may include a method of adsorbing iodine ions after a polyvinyl alcohol film is stretched, a method of performing stretching after a polyvinyl alcohol film is dyed by using a dichromatic dye, a method of performing dyeing by means of a dichromatic dye after a polyvinyl alcohol film is stretched, a method of performing stretching after a dichromatic dye is printed on a polyvinyl alcohol film, a method of performing printing by means of a dichromatic dye after a polyvinyl alcohol film is stretched, and the like. Specific examples include a method of producing a polarizing film, which includes dissolving iodine in a potassium iodide solution to produce iodine ions, adsorbing the ions on a polyvinyl alcohol film, stretching the film, and immersing the stretched film in a 1 to 4% boric acid aqueous solution at 30 to 40° C.; a method of producing a polarizing film, which includes treating a polyvinyl alcohol film by means of a boric acid, uniaxially stretching the film 3 to 7 times, immersing the film in a 0.05 to 5% dichromatic dye aqueous solution at 30 to 40° C. to adsorb a dye on the film, and drying the film at 80 to 100° C. to perform heat fixing; and the like.

In the present invention, the protective film that is provided on a side of the polyvinyl alcohol polarizing film and has the vapor transmissivity of 100 g/m$^2$ Day or less is disposed at an outermost edge of the liquid crystal display according to the present invention to significantly prevent reduction in functions of the polarizing film due to moisture and light leakage and egg-mura. In the present invention, the vapor transmissivity is not limited, but may be a value that is measured at 40° C. under a relative humidity condition of 90%.

In the film has the vapor transmissivity of 100 g/m$^2$ Day or less, the smaller the vapor transmissivity the better. Furthermore, if the film has the vapor transmissivity of more than 100 g/m$^2$ Day, it is difficult to protect the polarizing film from moisture. In the case of the film that has the vapor transmissivity of 100 g/m$^2$ Day or less, the vapor transmissivity is preferably 0.1 to 50 g/m$^2$ Day, and more preferably 0.5 to 10 g/m$^2$ Day.

The type of film that has the vapor transmissivity of 100 g/m$^2$ Day or less is not limited as long as the film has the vapor transmissivity which is in the above-mentioned range and does not negatively affect functions of the polarizing plate and the liquid crystal display. Non-limiting examples of the film that has the vapor transmissivity of 100 g/m$^2$ Day or less include COP (cycloolefin polymer), COC (cycloolefin copolymer), PNB (polynorbornene), and PET (polyethylene terephthalate).

It is preferable that the thickness of the film that has the vapor transmissivity of 100 g/m$^2$ Day or less be in the range of 30 to 100 micrometers.

In an embodiment of the present invention, the film that is provided on the surface abutting the liquid crystal cell of the polyvinyl alcohol polarizing film and has the vapor transmissivity of more than 1,500 g/m$^2$ Day is combined with the film that has the vapor transmissivity of 100 g/m$^2$ Day or less to desirably prevent light leakage and egg-mura of the liquid crystal display, and various types of adhesives such as an adhesive containing a solvent may be used when the first polarizing plate or the second polarizing plate and the liquid crystal cell are adhered to each other or when the polarizing film and the protective film are adhered to each other.

In another embodiment of the present invention, the film that is provided on the surface abutting the liquid crystal cell of the polyvinyl alcohol polarizing film and has the vapor transmissivity of more than 200 g/m$^2$ Day is combined with the film that contains a UV absorbing agent added thereto or has a UV absorption ability due to a UV absorption layer and has the vapor transmissivity of 100 g/m$^2$ Day or less to ensure the above-mentioned effects.

It is preferable that the protective film of the polarizing film that is provided on the surface abutting the liquid crystal cell has the vapor transmissivity of more than 1,500 g/m$^2$ Day and 5,000 g/m$^2$ Day or less.

Since the film that has the vapor transmissivity of more than 1,500 g/m$^2$ Day is used in conjunction with the film that has the very low vapor transmissivity, that is, the vapor transmissivity of 100 g/m$^2$ Day or less, if the vapor transmissivity is less than 1,500 g/m$^2$ Day, it is difficult to vaporize the solvent in the case where the adhesive containing the solvent is used. Thus, there is a problem in that adhesion strength is reduced. The film having the vapor transmissivity of more than 1,500 g/m$^2$ Day may be used as the protective film of the polarizing film that is provided on the surface abutting the liquid crystal cell to reduce a drying time of the adhesive, thus improving the productivity. In addition, since a drying process can be performed at low temperatures, it is possible to prevent problems such as reduction alignment stability or change of colors of the polarizing film that may occur during the drying at high temperatures. In the case where the film that has the vapor transmissivity less than 1,500 g/m$^2$ Day is used as the protective film of the polarizing film provided on the surface abutting the liquid crystal cell, since it is difficult to desirably dry the adhesive used to adhere the polarizing film and the protective film to each other, stains or traces may be formed due to the adhesive. Furthermore, if a retention time in an oven is increased in order to perform the desirable drying, the productivity is reduced, and if the film is left at high temperatures, optical properties are reduced.

Additionally, the vapor transmissivity of the film having the vapor transmissivity of more than 1,500 g/m$^2$ Day may be controlled to 5,000 g/m$^2$ Day or less to reduce curling (curling of the polarizing plate) which may occurs due to different moisture transmissivities of two protective films that protect a single polarizing film.

In the case where the film that has the vapor transmissivity of 100 g/m$^2$ Day or less has the UV absorption ability, if the vapor transmissivity of the protective film of the polarizing film that is provided on the surface abutting the liquid crystal cell is more than 200 g/m$^2$ Day, it is possible to prevent yellowing which may occur when the sunlight is radiated over a long period of time. Thus, desired properties of the polarizing plate are obtained. In this case, however, it is preferable that the vapor transmissivity of the protective film of the polarizing film provided on the surface abutting the liquid crystal cell be more than 1500 g/m$^2$ Day.

The type of protective film of the polarizing film that is provided on the surface abutting the liquid crystal cell is not limited as long as the film has the vapor transmissivity which is in the above-mentioned range and does not negatively affect functions of the polarizing plate and the liquid crystal display. In the present invention, a polyester film, a polyolefin film, an acetyl cellulose film, a polycarbonate film, a polyvinyl alcohol film, a polyether sulfone film, a polyarylate film, a polyimide film, a polyamide imide film, a polyamide film, and the like may be used. In order to ensure desirable performance of the polarizing film, an acetate resin such as triacetyl cellulose is preferably used so that an appearance and a flatness of the film are excellent and the vapor transmissivity is easily controlled to be in the above-mentioned range.

It is preferable that the thickness of the protective film of the polarizing film that is provided on the surface abutting the liquid crystal cell be in the range of 30 to 100 micrometers.

In the present invention, the films that are used as the protective films of the first polarizing plate and the second polarizing plate may be subjected to surface treatment in order to improve adhesion strength to the polyvinyl alcohol polarizing film or the liquid crystal cell.

In the present invention, the adhesion of the protective film and the polyvinyl alcohol polarizing film and the adhesion of the polarizing plate and the liquid crystal cell may be performed by using an adhesive which is known in the related art. Non-limiting examples thereof include a UV-curable adhesive, a solvent adhesive, an aqueous adhesive, a thermosetting adhesive, and the like. It is preferable to use the solvent or aqueous adhesive in views of productivity. Specifically, the polyvinyl alcohol adhesive, the polyurethane adhesive, and the like may be used. Particularly, in the present invention, in order to prevent light leakage at high temperatures, it is preferable to use a hard type adhesive in the polarizing plate.

In the polarizing plate that includes the polarizing film and the protective film, when the polarizing film and the protective film are laminated with each other by using the above-mentioned adhesive and then dried, the moisture content is set to be in a predetermined range to improve heat resistance of the polarizing plate. It is preferable that the moisture content after the polarizing plate is dried is 1 to 2 wt % based on a total weight of the polarizing plate.

In the present invention, when the protective films of the first polarizing plate and the second polarizing plate are produced, various types of additives such as a UV absorbing agent, an anti-blocking agent, a lubricant, an antistatic agent, and a stabilizer may be used if necessary.

Particularly, it is preferable to add the UV absorbing agent to the film that has the vapor transmissivity of 100 g/m$^2$ Day or less and is used as the outer protective film of the first polarizing plate or the second polarizing plate. Specifically, in order to ensure reliability of the polarizing plate in respects to UV, that is, in order to ensure the same polarizing efficiency after a predetermined time, it is preferable that a layer for protecting the polarizing film from UV be provided between a UV light source such as a backlight lamp (BLU Lamp) or solar light and the polarizing film. This is because the color of the polarizing plate is changed as the color of the protective film is changed. In addition, if UV is radiated, since the alignment property of iodine molecules is poor in the polarizing film, a contrast ratio of the liquid crystal display may be reduced with time or the color sense thereof may be changed with time. If the UV protective layer is not provided, it is difficult to use the polarizing plate due to reduction in polarizing efficiency.

Accordingly, in the present invention, the UV absorbing agent may be added to the protective film that is provided between the solar light and the polarizing film and is disposed to be closest to an observer or the protective film that is provided between the backlight lamp and the polarizing film and has the vapor transmissivity of 100 g/m$^2$ Day or less among the protective films for protecting the polarizing films. Furthermore, the UV absorption layer may be formed on an upper surface or a lower surface of the film that has the vapor transmissivity of 100 g/m$^2$ Day or less, which will be described below. For example, the UV absorbing agent may be applied on the film that has the vapor transmissivity of 100 g/m$^2$ Day or less to form the UV absorption layer. Alternatively, in the case where the antireflection layer or the hard coating layer is formed on the film that has the vapor transmissivity of 100 g/m$^2$ Day or less, the UV absorbing agent may be added to the layers. The UV absorbing agent may be added to the adhesive layer that is used to adhere the polarizing film and the film having the vapor transmissivity of 100 g/m$^2$ Day or less to each other. If the outer protective film of each of the polarizing plates has excellent resistance to UV, even though the inner protective film of each of the polarizing plates has relatively low resistance to UV, the inner protective film insignificantly affects a change in color of the polarizing plate. Particularly, it is important to provide resistance to UV to the protective film of the polarizing film that is disposed to be closest to an observer of the liquid crystal display, that is, the protective film that is provided between the solar light and the polarizing film.

Furthermore, in the liquid crystal display according to the present invention, one or more layers that are selected from the group consisting of an antireflection layer, a low reflection coating layer, a luminance improvement layer, an antistatic coating layer, and a hard coating layer may be further provided on the film that is disposed at an outermost edge of the liquid crystal display and the vapor transmissivity of 100 g/m$^2$ Day or less. The antireflection layer, the low reflection coating layer, the luminance improvement layer, the antistatic coating layer, or the hard coating layer may be provided on the surface that is opposite to the backlight of the liquid crystal display. The antireflection layer, the luminance improvement layer, or the hard coating layer may be provided on the surface abutting the backlight of the liquid crystal display. The UV absorbing agent may be further added to the layers of the liquid crystal display that is closest to an observer.

Specifically, the antireflection layer or the low reflection coating layer functions to prevent an observer from being dazzled in respects to the liquid crystal display. For example, the film that has the vapor transmissivity of 100 g/m$^2$ Day or less may be subjected to antireflection or low reflection coating to form the antireflection layer or the low reflection coating layer. Examples of a coating solution include, but are not limited to a composition comprising silica, an acryl binder, etc. The antireflection layer is also called as a layer incurring haze.

The UV absorption layer acts as a UV protective layer between the polarizing film and the UV light source to prevent discoloring of the polarizing plate due to UV. The UV absorbing agent may be added to the protective film of the polarizing film, particularly, the protective film of the polarizing film of the liquid crystal display that is disposed to be closest to an observer to form the UV absorption layer described above, the UV absorption layer may be applied on the protective film of the polarizing film or on another functional layer that is disposed on the protective film to form the UV absorption layer, or the UV absorbing agent may be added during the production of another functional layer to form the UV absorption layer. Alternatively, the UV absorbing agent may be added to the adhesive layer that is used to adhere the PVA polarizing film and the protective film to each other to form the UV absorption layer.

The luminance improvement layer functions to improve luminance of light that is emitted from the backlight. The luminance improvement film may be adhered to the protective film of the polarizing film, particularly, the protective film of the polarizing film that is disposed close to the backlight by using a pressure sensitive adhesive (PSA), or in the case where the luminance improvement film has the vapor transmissivity of 100 g/m$^2$ Day or less, the luminance improvement film may be directly adhered to the polarizing film.

The antistatic coating layer functions to prevent generation of inferior liquid crystal display modules due to static electricity, and coating may be performed to reduce surface resistance, thereby preventing static electricity from occurring on the surface of the polarizing plate. A coating solution that contains polythiophene may be used to form the antistatic coating layer, but the component contained in the coating solution is not limited thereto.

The hard coating layer functions to improve resistance to scratches of the liquid crystal display and easily remove stains formed by pens or the like. For example, when the liquid crystal modules (LCM) are produced and then transported to a liquid crystal display set maker, the film that is interposed between the polarizing film and the backlight may come into contact with the backlight sheet, thus forming defects. The defects may be confirmed by a vibration test. After a liquid crystal module is prepared and a 1.5 g weight is put on the liquid crystal module and vibrated for 1 hour, the liquid crystal module is operated to confirm nonuniform luminance or stains. The above-mentioned problems may occur in the case where hardness of the film that has the vapor transmissivity of 100 g/m² Day or less is low in the liquid crystal display according to the present invention. In order to prevent the above-mentioned problems from occurring, it is preferable that the film that has the vapor transmissivity of 100 g/m² Day or less be subjected to hard coating. This prevents damage to the film which has the vapor transmissivity of 100 g/m² Day or less and is disposed at an outermost edge of the liquid crystal display, for example, the cycloolefin film, due to the low hardness during a process of adhering the liquid crystal module to the backlight. For example, a coating solution that contains an acryl binder, silica, or the like may be applied on the film that has the vapor transmissivity of 100 g/m² Day or less to form the hard coating layer, but the types of material and process during the formation of the hard coating layer are not limited thereto.

Furthermore, in the liquid crystal display according to the present invention, the film that is provided on the polyvinyl alcohol polarizing film and has the vapor transmissivity of more than 200 g/m² Day and the luminance improvement film that is provided on the film having the vapor transmissivity of more than 200 g/m² Day may be further provided between the polyvinyl alcohol polarizing film and the film having the vapor transmissivity of 100 g/m² Day or less of the first polarizing plate or the second polarizing plate. It is preferable that the film having the vapor transmissivity of more than 200 g/m² Day have the vapor transmissivity of more than 1,500 g/m² Day.

The type of liquid crystal cell that is used in the liquid crystal display according to the present invention is not limited but may be a liquid crystal cell known in the related art. In the present invention, an IPS-, TN-, or VA-mode liquid crystal cell may be used.

The liquid crystal display according to the present invention may further include an optical compensation film between the first polarizing plate and the liquid crystal cell and/or between the second polarizing plate and the liquid crystal cell if necessary.

The present invention provides a polarizing plate that is useful to the above-mentioned liquid crystal display.

According to an embodiment of the present invention, a polarizing plate includes a polyvinyl alcohol polarizing film, a film that is provided on an upper surface of the polyvinyl alcohol polarizing film and has the vapor transmissivity of 100 g/m² Day or less, a film that is provided on a lower surface of the polyvinyl alcohol polarizing film and has the vapor transmissivity of more than 200 g/m² Day, and a UV absorption layer that is provided on the upper or lower surface of the film having the vapor transmissivity of 100 g/m² Day or less. It is preferable that the film having the vapor transmissivity of more than 200 g/m² Day have the vapor transmissivity of more than 1,500 g/m² Day.

In the polarizing plate, one or more layers that are selected from the group consisting of an antireflection layer, a low reflection coating layer, a luminance improvement layer, an antistatic coating layer, and a hard coating layer may be further provided between the film having the vapor transmissivity of 100 g/m² Day or less and the UV absorption layer or on the upper surface of the UV absorption layer. A UV absorbing agent may be added to the layers that are disposed close to an observer observing the liquid crystal display. Furthermore, in the polarizing plate, a film that is provided on an upper surface of the polyvinyl alcohol polarizing film and has the vapor transmissivity of more than 200 g/m² Day and a luminance improvement film that is provided on an upper surface of the film that has the vapor transmissivity of more than 200 g/m² Day may be further provided between the polyvinyl alcohol polarizing film and the film having the vapor transmissivity of 100 g/m² Day or less.

Specific embodiments of the present invention will be described in detail with reference to the drawings, but the scope of the present invention is not limited thereto.

The polarizing plate according to the present invention may have the structure shown in FIG. 5. Specifically, the polarizing plate shown in FIG. 5 includes a polyvinyl alcohol polarizing film, a film that is provided on an upper surface of the polyvinyl alcohol polarizing film and has the vapor transmissivity of 100 g/m² Day or less, a film that is provided on a lower surface of the polyvinyl alcohol polarizing film and has the vapor transmissivity of more than 200 g/m² Day, and a UV absorption layer and an antireflection layer or a low reflection coating layer that are provided on the upper surface of the film having the vapor transmissivity of 100 g/m² Day or less. The polarizing plate may be disposed to close to an observer observing the liquid crystal display.

The polarizing plate according to the present invention may have the structure shown in FIG. 6. Specifically, the polarizing plate shown in FIG. 6 includes a polyvinyl alcohol polarizing film, a film that is provided on an upper surface of the polyvinyl alcohol polarizing film and has the vapor transmissivity of 100 g/m² Day or less, a film that is provided on a lower surface of the polyvinyl alcohol polarizing film and has the vapor transmissivity of more than 200 g/m² Day, and a UV absorption layer and an antireflection layer or a hard coating layer that are provided on the upper surface of the film having the vapor transmissivity of 100 g/m² Day or less. The polarizing plate may be disposed to close to the backlight of the liquid crystal display.

The polarizing plate according to the present invention may have the structure shown in FIG. 7. Specifically, the polarizing plate shown in FIG. 7 includes a polyvinyl alcohol polarizing film, a film that is provided on an upper surface of the polyvinyl alcohol polarizing film and has the vapor transmissivity of 100 g/m² Day or less, a film that is provided on a lower surface of the polyvinyl alcohol polarizing film and has the vapor transmissivity of more than 200 g/m² Day, and a UV absorption layer and a luminance improvement film that are provided on the upper surface of the film having the vapor transmissivity of 100 g/m² Day or less. The polarizing plate may be disposed to close to the backlight of the liquid crystal display.

The polarizing plate according to the present invention may have the structure shown in FIG. 9. Specifically, the polarizing plate shown in FIG. 9 includes a polyvinyl alcohol polarizing film, a film that is provided on an upper surface of the polyvinyl alcohol polarizing film and has the vapor transmissivity of 100 g/m² Day or less, a film that is provided on a lower surface of the polyvinyl alcohol polarizing film and has the vapor transmissivity of more than 200 g/m² Day, and a UV absorption layer and an antistatic coating layer that are provided on the upper surface of the film having the vapor transmissivity of 100 g/m² Day or less. The polarizing plate may be disposed to close to an observer observing the liquid crystal display.

The polarizing plate according to the present invention may have the structure shown in FIG. 10. Specifically, the polarizing plate shown in FIG. 10 includes a polyvinyl alcohol polarizing film, a film that is provided on an upper surface of the polyvinyl alcohol polarizing film and has the vapor transmissivity of 100 g/m² Day or less, a film that is provided on a lower surface of the polyvinyl alcohol polarizing film and has the vapor transmissivity of more than 200 g/m² Day, and a UV absorption layer and a hard coating layer that are provided on the upper surface of the film having the vapor transmissivity of 100 g/m² Day or less. The polarizing plate may be disposed to close to an observer observing the liquid crystal display.

According to another embodiment of the present invention, a polarizing plate includes a polyvinyl alcohol polarizing film, a film that is provided on an upper surface of the polyvinyl alcohol polarizing film and has the vapor transmissivity of more than 200 g/m² Day, a luminance improvement film that is provided on an upper surface of the film having the vapor transmissivity of more than 200 g/m² Day, a film that is provided on the luminance improvement film and has the vapor transmissivity of 100 g/m² Day or less, a UV absorption layer that is provided on the upper surface of the film having the vapor transmissivity of 100 g/m² Day or less, and a film that is provided on a lower surface of the polyvinyl alcohol polarizing film and has the vapor transmissivity of more than 200 g/m² Day. The polarizing plate having the above-mentioned structure is shown in FIG. 8.

Elements that constitute the polarizing plate according to the present invention are the same as those of the liquid crystal display. The polarizing plate according to the present invention may further include an adhesive layer that is provided on the surface of the film that is in contact with the liquid crystal cell and has the vapor transmissivity of more than 200 g/m² Day.

Furthermore, an adhesive layer may be provided between the polarizing film and the protective film of the polarizing plate to adhere the polarizing film and the protective film to each other. In this connection, a UV absorbing agent may be added to the adhesive layer that is interposed between the polarizing film and the film having the vapor transmissivity of 100 g/m² Day or less.

MODE FOR THE INVENTION

A better understanding of the present invention may be obtained in light of the following Examples which are set forth to illustrate, but are not to be construed to limit the present invention.

EXAMPLES 1 AND 2 AND COMPARATIVE EXAMPLES 1 to 4

The liquid crystal modules that included liquid crystal cells and polarizing plates containing the protective films shown in the following Table 1 provided on both sides of the liquid crystal cell were produced. The IPS liquid crystal cell which was filled with the liquid crystal having the pre-tilt angle of 2°, the dielectric anisotropy $\Delta\in$ of +7, and the birefringence $\Delta n$ of 0.1 and had the cell gap of 3.4□ was used as the liquid crystal cell of the liquid crystal module. The polyvinyl alcohol polarizing film was used as the polarizing film of the liquid crystal module. The polarizing film and the protective film were adhered and the polarizing plate and the liquid crystal cell were adhered by using the adhesive where polyvinyl alcohol was dissolved in water. In the case where the UV absorbing agent (2,2-dihydroxy-4-methoxybenzophenone) was contained, the UV absorbing agent was added to the coating layer of the outer protective film.

TABLE 1

Test conditions of Examples 1 and 2 and Comparative Examples 1 to 4

| | Outer protective film of first polarizing plate | Inner protective film of first polarizing plate | Inner protective film of second polarizing plate | Outer protective film of second polarizing plate | UV absorbing agent |
|---|---|---|---|---|---|
| Example 1 | COP (vapor transmissivity 5 g/m² Day, moisture absorptivity 0.1% or less, and thickness 60 □) | TAC (vapor transmissivity 2400 g/m² Day, moisture absorptivity 3.9%, and thickness 80 □) | TAC (vapor transmissivity 2400 g/m² Day, moisture absorptivity 3.9%, and thickness 80 □) | COP (vapor transmissivity 5 g/m² Day, moisture absorptivity 0.1% or less, and thickness 60 □) | Contained in outer protective film |
| Comparative Example 1 | TAC (vapor transmissivity 2400 g/m² Day, moisture absorptivity 3.9%, and thickness 80 □) | TAC (vapor transmissivity 2400 g/m² Day, moisture absorptivity 3.9%, and thickness 80 □) | TAC (vapor transmissivity 2400 g/m² Day, moisture absorptivity 3.9%, and thickness 80 □) | TAC (vapor transmissivity 2400 g/m² Day, moisture absorptivity 3.9%, and thickness 80 □) | Contained in outer protective film |
| Comparative Example 2 | TAC (vapor transmissivity 2400 g/m² Day, moisture absorptivity 3.9%, and thickness 80 □) | COP (vapor transmissivity 5 g/m² Day, moisture absorptivity 0.1% or less, and thickness 60 □) | COP (vapor transmissivity 5 g/m² Day, moisture absorptivity 0.1% or less, and thickness 60 □) | TAC (vapor transmissivity 2400 g/m² Day, moisture absorptivity 3.9%, and thickness 80 □) | Contained in outer protective film |
| Comparative Example 3 | TAC (vapor transmissivity 2400 g/m² Day, moisture absorptivity 3.9%, and thickness 80 □) | COP (vapor transmissivity 5 g/m² Day, moisture absorptivity 0.1% or less, and thickness 60 □) | TAC (vapor transmissivity 2400 g/m² Day, moisture absorptivity 3.9%, and thickness 80 □) | COP (vapor transmissivity 5 g/m² Day, moisture absorptivity 0.1% or less, and thickness 60 □) | Contained in outer protective film |
| Comparative Example 4 | COP (vapor transmissivity 5 g/m² Day, moisture absorptivity 0.1% or less, and thickness 60 □) | TAC (vapor transmissivity 2400 g/m² Day, moisture absorptivity 3.9%, and thickness 80 □) | COP (vapor transmissivity 5 g/m² Day, moisture absorptivity 0.1% or less, and thickness 60 □) | TAC (vapor transmissivity 2400 g/m² Day, moisture absorptivity 3.9%, and thickness 80 □) | Contained in outer protective film |

TABLE 1-continued

Test conditions of Examples 1 and 2 and Comparative Examples 1 to 4

|  | Outer protective film of first polarizing plate | Inner protective film of first polarizing plate | Inner protective film of second polarizing plate | Outer protective film of second polarizing plate | UV absorbing agent |
|---|---|---|---|---|---|
| Example 2 | COP (vapor transmissivity 5 g/m² Day, moisture absorptivity 0.1% or less, and thickness 60 □) | TAC (vapor transmissivity 2400 g/m² Day, moisture absorptivity 3.9%, and thickness 80 □) | TAC (vapor transmissivity 2400 g/m² Day, moisture absorptivity 3.9%, and thickness 80 □) | COP (vapor transmissivity 5 g/m² Day, moisture absorptivity 0.1% or less, and thickness 60 □) | None |

The liquid crystal modules that were produced in Example 1 and Comparative Example 1 were left in a 80% chamber at 50° C. for 72 hours and then discharged from the chamber. Four corners of the liquid crystal cell in the black mode state at normal temperature and the outskirts thereof were observed by the naked eye in views of a difference in luminance to evaluate prevention of light leakage. The procedures were repeated twice in respects to the liquid crystal module of Example 1 and three times in respects to the liquid crystal module of Comparative Example 1. The evaluation results are shown in FIG. 11.

The liquid crystal modules that were produced in Examples 1 and 2 and Comparative Examples 2 to 4 were left in a 80% chamber at 50° C. for 24 hours and then discharged from the chamber. Four corners of the liquid crystal cell in the black mode state at normal temperature and the outskirts thereof were observed by the naked eye in views of a difference in luminance to evaluate prevention of light leakage. The evaluation results are shown in FIG. 12.

The liquid crystal modules that were produced in Examples 1 and 2 were left in a 80% chamber at 50° C. for 240 hours and then discharged from the chamber. Four corners of the liquid crystal cell in the black mode state at normal temperature and the outskirts thereof were observed by the naked eye in views of a difference in luminance to evaluate prevention of light leakage. The evaluation results are shown in FIG. 13.

In Comparative Examples 1 to 4, the light leakage was observed immediately after the liquid crystal modules were discharged from the chambers, and light leakage were growing worse at normal temperature. However, in Examples 1 and 2, even though the liquid crystal modules were left at normal temperature for 6 hours, the light leakage was not observed.

In addition, an antireflection layer (AG coating) was formed on a COP layer of each of the liquid crystal modules that were produced in Examples 1 and 2 and Comparative Examples 1 to 4, UV was radiated on the COP layer on which the antireflection layer was provided by using a UVA-340 lamp as the UV lamp for 150 hours, and the polarizing plate was observed. The yellowing was evaluated by using a UV-VIS Spectrophotometer (trade name: model U-3310, manufactured by Hitachi, Inc.). In this case, the yellowing did not occurred in Examples 1 and Comparative Examples 1 to 4, but yellowing occurred in Example 2.

Tc (cross transmissivity) and Ts (simple transmissivity) of each of the liquid crystal modules of Examples 1 and 2 were evaluated before and after radiation of UV, and the results are shown in FIGS. 14 and 15. Tc (cross transmissivity) and Ts (simple transmissivity) were obtained by using the following procedure. A sample was perpendicularly fixed in respects to an optical axis of the spectrophotometer, and measurement was performed when the absorption axis of the sample was 45° and 135°. The measurement wavelength was in the range of 400 to 700 nm, and the measurement was performed at intervals of 10 nm to obtain $T_{45}(\lambda)$, $T_{135}(\lambda)$, $TC_{45}(\lambda)$, and $TC_{135}(\lambda)$ (see FIG. 16). Tc (cross transmissivity) and Ts (simple transmissivity) were calculated by using the obtained values based on the luminosity correction according to a 2° visual field XYZ system of the JIS Z 8701.

simple transmissivity:

$$Ts(\%)=Y=K\times\Sigma\{S(\lambda)\times y(\lambda)\times(T_{45}(\mu)+T_{135}(\lambda))/2\}$$
($\Sigma$=400 to 700 nm)

cross transmissivity:

$$Tc(\%)=K\times\Sigma\{S(\lambda)\times y(\lambda)\times TC(\lambda)\} \; (\Sigma\text{=400 to 700 nm})$$

K: correction coefficient (0.09395)
S(λ): relative spectral distribution of light source
y(λ): metamerism coefficient

TABLE 2

Evaluation results of Examples 1 and 2 and Comparative Examples 1 to 4

|  | Light leakage | Yellowing |
|---|---|---|
| Example 1 | None | None |
| Comparative Example 1 | Observed | None |
| Comparative Example 2 | Observed | None |
| Comparative Example 3 | Observed | None |
| Comparative Example 4 | Observed | None |
| Example 2 | None | Observed |

From the results of Comparative Examples and Examples, it can be seen that in the case where the protective film of the polarizing film having the vapor transmissivity of 100 g/m² Day or less is disposed at an outermost edge of the liquid crystal display and the film having the vapor transmissivity of more than 1,500 g/m² Day is used as the protective film provided on another side of the polarizing film, light leakage is avoided. Furthermore, in the case where the protective film does not contain the UV absorbing agent, yellowing is prevented only when the UV absorbing agent is added to the film.

EXAMPLE 3 AND COMPARATIVE EXAMPLE 5

The liquid crystal modules were produced by using the same procedure as Example 2, except that the polarizing plate contained the protective film shown in the following Table 3, and adhesive stains and traces were observed. After the polarizing plate was provided on the backlight unit (BLU) in an orthogonal state, a transmission inspection was performed to observe the adhesive stains by the naked eye, and a reflection inspection was performed to observe the traces by reflecting light emitted from a fluorescent lamp. The results are described in the following Table 3.

TABLE 3

Test conditions and results of Example 3 and Comparative Example 5

|  | Outer protective films of first and second polarizing plates | Inner protective films of first and second polarizing plates | Adhesive stain | Trace |
| --- | --- | --- | --- | --- |
| Example 3 | COP (vapor transmissivity 3 g/m² Day and thickness 60 ▢) | TAC (vapor transmissivity 2400 g/m² Day and thickness 80 ▢) | 8/20 | 2/20 |
| Comparative Example 5 | COP (vapor transmissivity 3 g/m² Day and thickness 60 ▢) | TAC (vapor transmissivity 1200 g/m² Day and thickness 80 ▢) | 4/20 | 0/20 |

From the results of Table 3, it can be seen that in the case where the film having the vapor transmissivity of more than 1500 g/m² Day is used as the inner protective film like Example 3, Example 3 is better than Comparative Example 5 in terms of the adhesive stains and the traces.

EXAMPLE 4

In order to confirm degradation of optical properties in the case where the polarizing film was left at high temperatures to dry the adhesive, the following experiment was performed. After the polyvinyl alcohol polarizing film was attached to the glass substrate, optical properties such as Tc (cross transmissivity) and Ts (simple transmissivity) were measured before and after the resulting substrate was left at 80° C. for 15 hours, and color values a and b were calculated. The color values were calculated by using the following procedure. First, the transmissivity of the polarizing plate at the absorption axis angle of 45° was measured to obtain X and Z values based on the luminosity correction (400 to 700 nm and 10 nm interval) according to a 2° visual field XYZ system of the JIS Z 8701.

$X = K \times \Sigma \{S(\lambda) \times x(\lambda) \times (T45(\lambda) + T135(\lambda))/2\}$ ($\Sigma$=400 to 700 nm)

$Z = K \times \Sigma \{S(\lambda) \times z(\lambda) \times (T45(\lambda) + T135(\lambda))/2\}$ ($\Sigma$=400 to 700 nm)

K=correction coefficient (0.09395)
S($\lambda$): relative spectral distribution of light source
x($\lambda$) and z($\lambda$): metamerism coefficient
Y: simple transmissivity (Ts)

The color values a and b were obtained by means of the following Equations using the obtained X and Z values.

$a = 17.5 \times (1.02X - Y)/Y^{1/2}$ $b = 7 \times (Y - 0.847Z)/Y^{1/2}$

TABLE 4

|  | Ts | Tc | a | b |
| --- | --- | --- | --- | --- |
| Before heat resistant treatment | 42.33 | 0.00311 | −1.55 | 4.27 |

TABLE 4-continued

|  | Ts | Tc | a | b |
| --- | --- | --- | --- | --- |
| After heat resistant treatment | 43.07 | 0.00934 | −1.97 | 5.38 |

As shown in Table 4, optical properties are reduced in the case where the polarizing film was left at high temperatures.

In the case where the film having the vapor transmissivity of 1500 g/m² Day or less is used as the inner protective film of the polarizing film, the adhesive that is used to adhere the polarizing film and the protective film to each other is not easily dried. Thus, if the drying temperature of the adhesive is increased to desirably dry the adhesive, the optical properties of the polarizing film are reduced.

The invention claimed is:

1. A liquid crystal display that includes a liquid crystal cell and a first polarizing plate and a second polarizing plate respectively provided on each side of the liquid crystal cell, wherein the first polarizing plate and the second polarizing plate each includes a polyvinyl alcohol polarizing film and protective films provided on both sides of the polyvinyl alcohol polarizing film, the protective films that are provided on surfaces opposite to the liquid crystal cell of the first polarizing plate and the second polarizing plate each has the vapor transmissivity of 100 g/m²Day or less, and the protective films that are provided on surfaces abutting the liquid crystal cell of the first polarizing plate and the second polarizing plate each has the vapor transmissivity of more than 1,500 g/m²Day, the liquid crystal display further comprising a film that is provided on the polyvinyl alcohol polarizing film and has the vapor transmissivity of more than 200 g/m²Day and a luminance improvement film that is provided on the film having the vapor transmissivity of more than 200 g/m²Day between the polyvinyl alcohol polarizing film and the film having the vapor transmissivity of 100 g/m²Day or less of at least one polarizing film of the first polarizing plate and the second polarizing plate.

2. The liquid crystal display according to claim 1, wherein the film having the vapor transmissivity of 100 g/m²Day or less is a film that is made of a material selected from the group consisting of COP (cycloolefin polymer), COC (cycloolefin copolymer), PNB (polynorbornene), and PET (polyethylene terephtalate).

3. The liquid crystal display according to claim 1, wherein the film having the vapor transmissivity of more than 1,500 g/m²Day is a triacetyl cellulose film.

4. The liquid crystal display according to claim 1, wherein the first polarizing plate or the second polarizing plate and the liquid crystal cell, or the polyvinyl alcohol polarizing film and the protective film are adhered to each other by using a solvent adhesive or an aqueous adhesive.

5. The liquid crystal display according to claim 1, wherein the protective film of at least one polarizing plate of the first polarizing plate and the second polarizing plate contains one or more additives selected from the group consisting of a UV absorbing agent, an anti-blocking agent, a lubricant, an anti-static agent, and a stabilizer.

6. The liquid crystal display according to claim 5, wherein each of the films having the vapor transmissivity of 100 g/m²Day or less of the first polarizing plate and the second polarizing plate contains the UV absorbing agent.

7. The liquid crystal display according to claim 1, wherein one or more layers that are selected from the group consisting of an antireflection layer, a low reflection coating layer, a UV absorption layer, a luminance improvement layer, an antistatic coating layer, and a hard coating layer are further provided on the film having the vapor transmissivity of 100 g/m²Day or less of at least one polarizing plate of the first polarizing plate and the second polarizing plate.

8. The liquid crystal display according to claim 7, wherein at least one layer of the layers that are provided on the film having the vapor transmissivity of 100 g/m²Day or less contains a UV absorbing agent.

9. The liquid crystal display according to claim 7, wherein the UV absorption layer is provided on each of the films having the vapor transmissivity of 100 g/m²Day or less of the first polarizing plate and the second polarizing plate.

10. The liquid crystal display according to claim 1, wherein an adhesive layer is provided between the polarizing film and the protective film of at least one polarizing plate of the first polarizing plate and the second polarizing plate and the adhesive layer contains a UV absorbing agent.

11. The liquid crystal display according to claim 1, wherein each moisture content of the first polarizing plate and the second polarizing plate is 1 to 2 wt % based on a total weight of the polarizing plate.

12. A liquid crystal display that includes a liquid crystal cell, and a first polarizing plate and a second polarizing plate respectively provided on each side of the liquid crystal cell, wherein the first polarizing plate and the second polarizing plate each includes a polyvinyl alcohol polarizing film and protective films provided on both sides of the polyvinyl alcohol polarizing film, the protective films that are provided on surfaces opposite to the liquid crystal cell of the first polarizing plate and the second polarizing plate each has the vapor transmissivity of 100 g/m²Day or less, the protective films that are provided on surfaces abutting the liquid crystal cell of the first polarizing plate and the second polarizing plate each has the vapor transmissivity of more than 200 g/m²Day, and
the film having the vapor transmissivity of 100 g/m²Day or less contains a UV absorbing agent or a UV absorption layer is provided on an upper surface or a lower surface of the film having the vapor transmissivity of 100 g/m²Day or less, and
the liquid crystal display further comprises a film that is provided on the polyvinyl alcohol polarizing film and has the vapor transmissivity of more than 200 g/m²Day and a luminance improvement film that is provided on the film having the vapor transmissivity of more than 200 g/m²Day between the polyvinyl alcohol polarizing film and the film having the vapor transmissivity of 100 g/m²Day or less of at least one polarizing film of the first polarizing plate and the second polarizing plate.

13. The liquid crystal display according to claim 12, wherein the film having the vapor transmissivity of 100 g/m²Day or less is a film that is made of a material selected from the group consisting of COP (cycloolefin polymer), COC (cycloolefin copolymer), PNB (polynorbornene), and PET (polyethylene terephtalate).

14. The liquid crystal display according to claim 12, wherein the film having the vapor transmissivity of more than 200 g/m²Day is a triacetyl cellulose film.

15. The liquid crystal display according to claim 12, wherein the first polarizing plate or the second polarizing plate and the liquid crystal cell, or the polyvinyl alcohol polarizing film and the protective film are adhered to each other by using a solvent adhesive or an aqueous adhesive.

16. The liquid crystal display according to claim 12, wherein the protective film of at least one polarizing plate of the first polarizing plate and the second polarizing plate contains one or more additives selected from the group consisting of a UV absorbing agent, an anti-blocking agent, a lubricant, an antistatic agent, and a stabilizer.

17. The liquid crystal display according to claim 12, wherein one or more layers that are selected from the group consisting of an antireflection layer, a low reflection coating layer, a UV absorption layer, a luminance improvement layer, an antistatic coating layer, and a hard coating layer are further provided on the film having the vapor transmissivity of 100 g/m²Day or less of at least one polarizing plate of the first polarizing plate and the second polarizing plate.

18. The liquid crystal display according to claim 12, wherein an adhesive layer is provided between the polarizing film and the protective film of at least one polarizing plate of the first polarizing plate and the second polarizing plate and the adgesive layer contains a UV absorbing agent.

19. The liquid crystal display according to claim 12, wherein each moisture content of the first polarizing plate and the second polarizing plate is 1 to 2 wt % based on a total weight of the polarizing plate.

20. A polarizing plate comprising:
a polyvinyl alcohol polarizing film;
a film that is provided on an upper surface of the polyvinyl alcohol polarizing film and has the vapor transmissivity of 100 g/m²Day or less;
a film that is provided on a lower surface of the polyvinyl alcohol polarizing film and has the vapor transmissivity of more than 200 g/m²Day;
a UV absorption layer that is provided on the upper or lower surface of the film having the vapor transmissivity of 100 g/m²Day or less; and
a film that is provided on an upper surface of the polyvinyl alcohol polarizing film and has the vapor transmissivity of more than 200 g/m²Day and a luminance improvement film that is provided on an upper surface of the film having the vapor transmissivity of more than 200 g/m²Day between the polyvinyl alcohol polarizing film and the film having the vapor transmissivity of 100 g/m²Day or less.

21. The polarizing plate according to claim 20, wherein one or more layers that are selected from the group consisting of an antireflection layer, a low reflection coating layer, a luminance improvement layer, an antistatic coating layer, and a hard coating layer are further provided on the upper surface of the film having the vapor transmissivity of 100 g/m²Day or less or an upper surface of the UV absorption layer.

22. The polarizing plate according to claim 20, wherein a moisture content of the polarizing plate is 1 to 2 wt % based on a total weight of the polarizing plate.

* * * * *